United States Patent [19]

Omholt

[11] 4,413,699
[45] Nov. 8, 1983

[54] MOTORCYCLE

[76] Inventor: Bruce D. Omholt, 2117 Richmond, NW., Grand Rapids, Mich. 49504

[21] Appl. No.: 155,611

[22] Filed: Jun. 2, 1980

[51] Int. Cl.³ ............................................. B62K 11/04
[52] U.S. Cl. ............................. 180/219; 280/281 LP
[58] Field of Search ................. 180/219; 280/281 LP, 280/281 B, 281 R

[56] References Cited

U.S. PATENT DOCUMENTS

| D. 34,381 | 4/1901 | Manson . | |
|---|---|---|---|
| D. 56,551 | 11/1920 | Campling . | |
| D. 243,755 | 3/1957 | Silva, Jr. . | |
| 2,720,273 | 10/1955 | Johnson et al. | 280/281 B X |
| 2,908,510 | 10/1959 | Lossau | 280/281 B |
| 2,937,884 | 5/1960 | Lossau | 280/281 B X |
| 3,897,842 | 8/1975 | Rheaume et al. . | |
| 4,010,812 | 3/1977 | Bothwell | 280/281 B X |
| 4,094,375 | 6/1978 | Doncque | 280/281 R X |

FOREIGN PATENT DOCUMENTS

| 1035501 | 10/1953 | Fed. Rep. of Germany ... 280/281 B |
| 561478 | 10/1923 | France ................................. 180/219 |
| 520241 | 3/1955 | Italy ..................................... 180/219 |
| 242036 | 11/1925 | United Kingdom ................ 180/219 |
| 324794 | 2/1930 | United Kingdom ................ 180/219 |
| 657203 | 9/1951 | United Kingdom . |
| 1559777 | 1/1980 | United Kingdom ................ 180/219 |

Primary Examiner—Joseph Paul Brust
Attorney, Agent, or Firm—Emrich, Lee, Brown & Hill

[57] ABSTRACT

The frame of the vehicle includes a forward section which provides a mounting for the front wheel and motor, a rear section for mounting the rear wheel, and an intermediate section extending between and connecting the other two sections. The intermediate frame section is elongated and lower than the front and rear frame sections so that the rider sits lower in the vehicle and with improved link angles, particularly at the hip and knee of the rider. A support module, mounted at the top of the rear frame section, is movable between a forward position in which it provides upper back support for the rider, and a rear position in which it provides lower back support for a passenger. The seat for the passenger is located at the top of the rear frame section so that his head is well above the head of the rider when the vehicle is in use. The support module is preferably also a container which may also be completely removed from the rear frame section, and it carries the vehicle license plate and rear light for greater protection against theft. Panels are secured to the frame for creating an air stream to reduce drag.

2 Claims, 11 Drawing Figures

MOTORCYCLE

BACKGROUND AND SUMMARY

The present invention relates to motorcyles—that is, two-wheeled vehicles wherein the rider or operator normally straddles the engine during operation, and uses his hands to steer the front wheel as well as to operate the controls. Sometimes the feet are used to operate a clutch, brake or to shift. There are, of course, many different designs for motorcycles which have been in actual use or proposed. A typical motorcycle which is commercially available has a saddle for a rider which places him directly above the engine which he straddles with his legs. Typically, the rider's torso is generally upright, and for the most part, his body from the hips upward extends above the vehicle. He may receive lower back support by design of the seat which may extend upwardly to provide support.

In the riding position, in a typical conventional vehicle, the thighs extend forwardly generally horizontally, and the knees are then bent at an acute angle so that the feet generally lie beneath the torso of the rider during use. If the vehicle is designed to take a passenger, the passenger normally sits at the same elevation as the rider, directly behind the rider, and assumes a similar position except that the passenger's legs are normally more cramped than those of the rider, and the principal support for the passenger is received by holding onto the rider.

There are number of disadvantages associated with vechicles of this type. Where the rider is located on top of the vehicle—that is, with his torso extending above the engine, the center of gravity of combined vehicle and rider is relatively high and this reduces maneuverability of the vehicle and, of course, increases any tendency toward tipping. Further, with the torso of the passenger fully exposed above the vehicle, wind drag is increased to reduce fuel economy. Still further, the passenger is largely exposed so that in the event of an accident, there is a greater tendency toward serious injury.

The improvements of the present invention increase the safety and fuel economy of a motorcycle vehicle while also enhancing its operational characteristics and comfort, by lowering the rider into the vehicle and by re-orienting his body relative to the major components of the vehicle to improve the link angles of the body. By "link" angles is meant the angle the members of the body take at the major joints—hip, knee and ankle. By improving passenger comfort, support and safety, rider fatigue is reduced and the same vehicle therefore has a broader range of uses.

To accomplish this, the frame of the vehicle is provided in three major sections, including a front section, a rear section, and an intermediate section joining the front and rear sections. The front section of the frame provides mounting for the front wheel and steering mechanism, and the motor. The rear section provides mounting means for the rear wheel and any shock cushioning structure. The intermediate frame section has a lower profile than the forward and rear frame sections and provides seating for the rider.

When the rider is seated, his legs extend forwardly to straddle the engine housed in the forward frame section at an angle of about 40–50 degrees below the horizontal. The link angle at the knee is approximately 110 degrees, and the thighs are elevated at about 20 degrees relative to the horizontal.

The seat of the vehicle extends upwardly supported by the rear frame section to provide a backrest, and defines a comfortable hip link angle.

At the top of the rear frame section, there is a support module which is mounted in such a manner that it may be secured to the vehicle either at a forward position, a rear position, or be removed entirely and carried with the rider, acting as a container for personal effects or the like.

A support cushion is provided at the front of the support module. When the support module is in the forward position, the cushion acts as a support for the upper back (thoracic) area of the rider. When the support module is moved to its rear position, it uncovers a seat for the passenger, and its forward cushion also acts as a support for the lower back area (lumbar region) of the passenger. Thus, the passenger occupies a position above the rider, with the lower back supported by the support module and the abdomen resting against and supporting the thoracic area of the rider.

In a preferred embodiment, the support module is used not only as a container for storage and transportation of items, and which can be completely removed from the rear frame section of the vehicle, but it also acts as a mount for the vehicle license plate and houses the rear light of the vehicle. Thus, when it is removed, the vehicle cannot be legally operated because it has no rear light and no vehicle license plate, and will attract police attention. Thus, the removable module serves as a protection against theft.

The preferred embodiment also has panels secured to the frame, as disclosed below, for providing a decorative effect as well as for creating an air stream pattern when the vehicle is in motion to reduce wind drag.

Other features and advantages of the present invention will be apparent to persons skilled in the art from the following detailed description of a preferred embodiment accompanied by the attached drawing wherein identical reference numerals will refer to like elements in the various views.

THE DRAWING

DETAILED DESCRIPTION

Figure 1:
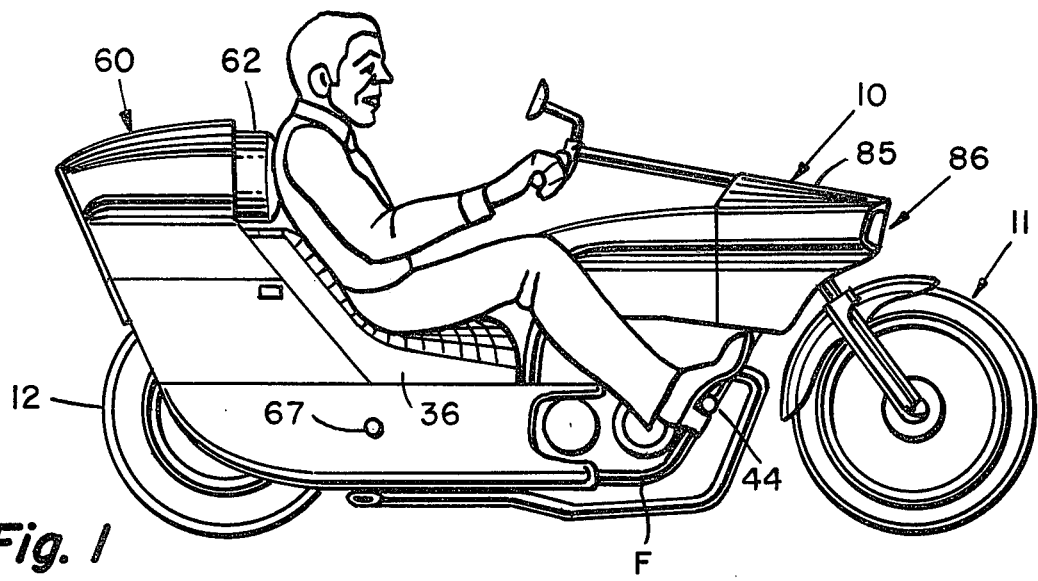
FIG. 1 is a side elevational view of a vehicle constructed according to the present invention with a rider in the normal operating position.
Figure 2:
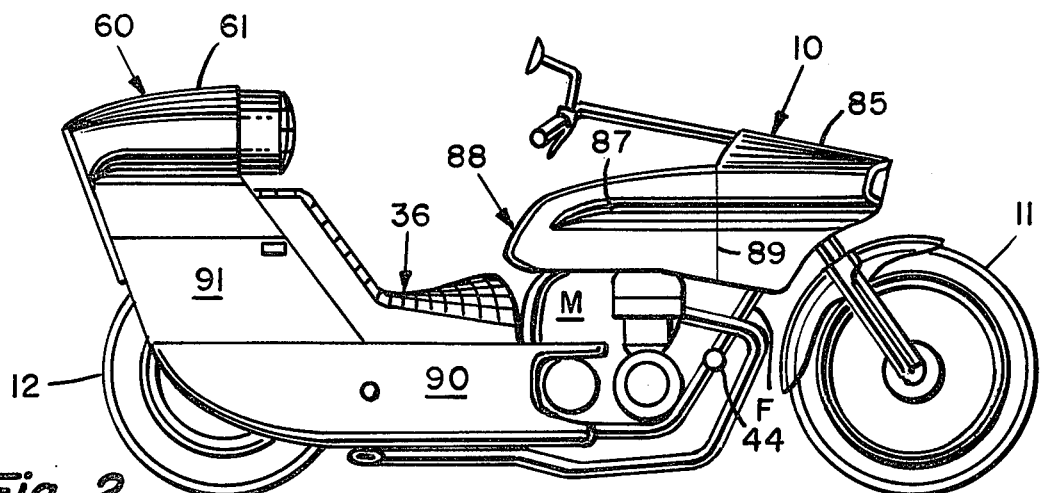
FIG. 2 is a view similar to FIG. 1 without a rider.
Figure 3:
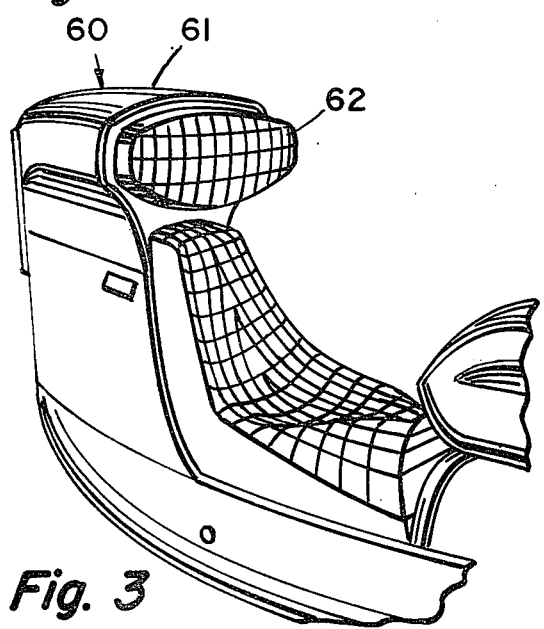
FIG. 3 is a fragmentary perspective view of the rear of the vehicle, taken from the upper right side thereof, and with the support module in its forward position.
Figure 4:
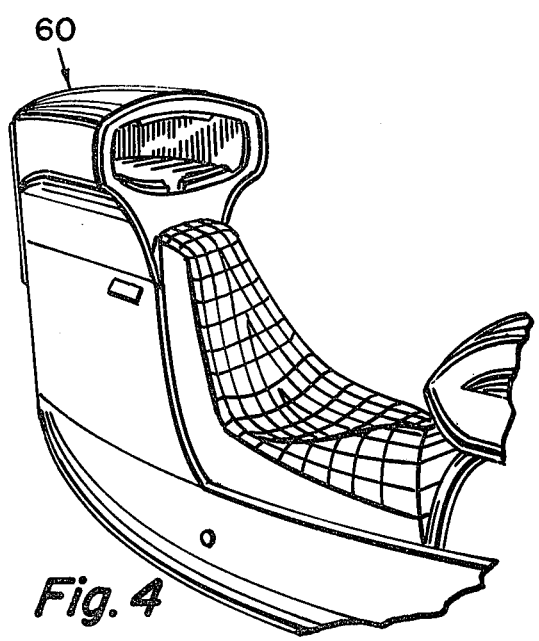
FIG. 4 is a view similar to FIG. 3 showing the front cushion of the support module removed.

Referring first to FIGS. 1 and 2, reference numeral 10 generally designates a vehicle in the form of a motorcycle having a front wheel 11, rear wheel 12 and frame designated F.

Figure 9:
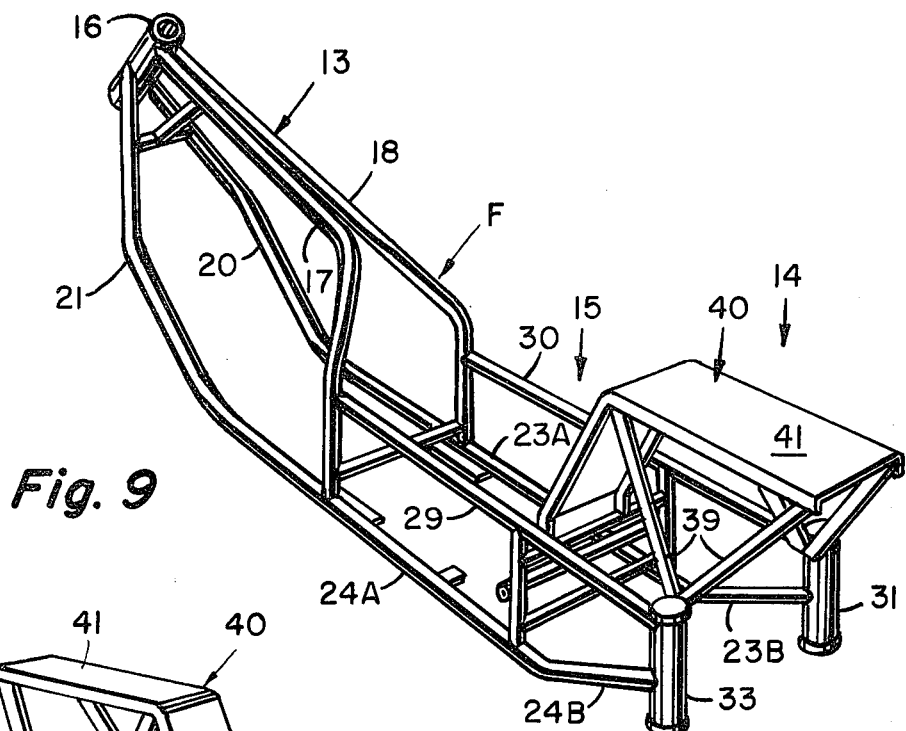
FIG. 9 is a perspective view of the frame of the vehicle, taken from the rear and left side of the vehicle.
Figure 10:
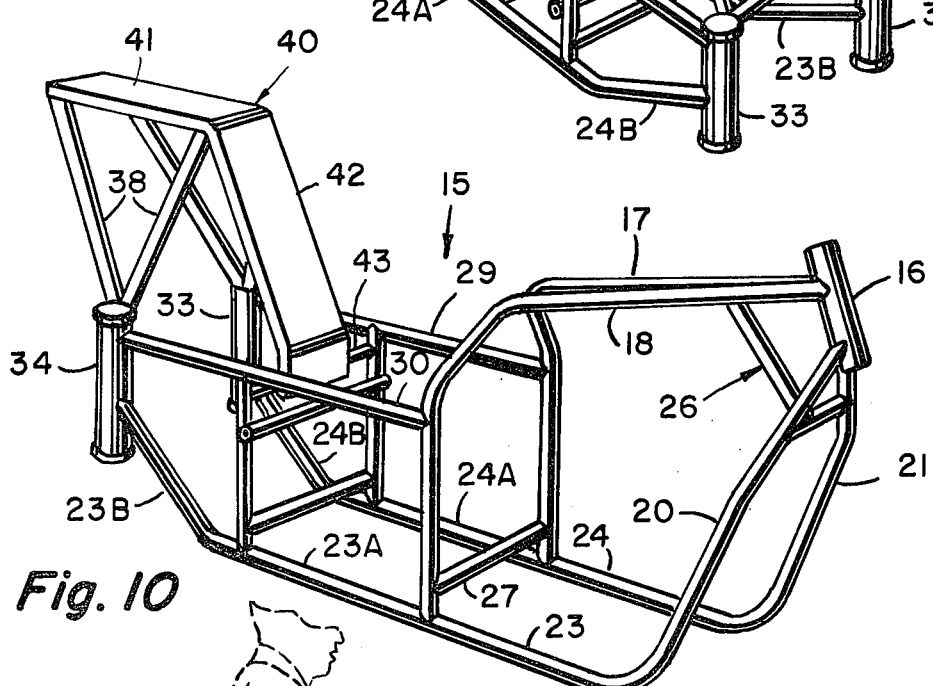
FIG. 10 is also a perspective view of the frame, taken from the front and right side of the vehicle, and at a lower angle than FIG. 9.
Figure 11:
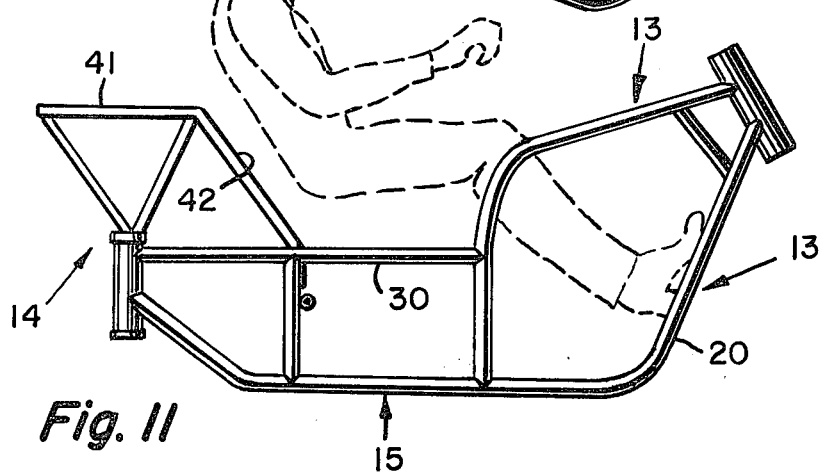
FIG. 11 is a right side elevational view of the frame of the vehicle showing the position of an idealized rider in chain line.

In order to understand the underlying structure better, reference is now made to FIGS. 9-11 wherein the frame F includes a forward section 13, a rear section 14 and an intermediate section 15.

The two principal functions of the forward frame section 13 are to mount the front wheel 11 and to mount and house the engine designated M in FIG. 2. Thus, the forward frame section includes a neck 16 to which are welded two tubular frame pieces 17, 18 which extend rearwardly of the neck 16 and thence downwardly. These two frame pieces separate as seen best in FIG. 9 as they extend downwardly. They form what may be referred to as a "backbone".

The forward frame section also includes two lower tubular members 20, 21 which are welded to the lower portion of the neck 16 and extend downwardly and rearwardly while separating from one another, and are then formed to extend laterally as at 23 and 24. The lower ends of the tubular frame members 17, 18 are welded to the tops of the runners 24, 23 respectively to define the engine housing, but the runners 23, 24 extend rearwardly beyond the forward frame section and provide lower, spaced frame portions 23A, 24A of the intermediate frame section 15, respectively. These lower tubular members are then bent upwardly as they extend rearwardly and also form a portion of the rear frame section, as designated at 23B, 24B respectively. The forward frame section is suitably braced by an inverted T-shaped brace 26 and a spacer 27. The engine is mounted by any conventional means within the forward frame section.

The intermediate frame section 15 further includes upper horizontal frame portions 29, 30 which also extend rearwardly and are joined to shock cushioning sleeves 33, 34 which are used to mount the rear wheel.

The principal function of the center frame section 15 is to supply a support for the rider seat designated 36 in FIGS. 1 and 2 which lowers the rider into the vehicle, in relation to the position the rider assumes in a conventional, commercial motorcycle. This aspect of the invention will be explained in more detail below.

The rear frame section 14 also includes a pair of tubular members on either side. Each pair is formed in the shape of a V and designated respectively 38 in FIG. 10 and 39 in FIG. 9. These members are attached to a flanged support member generally designated 40, which includes an upper horizontal rear portion 21 and a forward, downwardly inclined back rest support portion 42, the lower end of which is attached to a cross frame member 43 (FIG. 10).

Referring now to FIG. 11, the position of a rider is seen in relation to the frame. Specifically, the rider is lowered into the frame in relation to prior design, and the link angles of the hip, knee and ankle are "opened". This is accomplished by inclining the back support rearwardly at an angle of approximately 28 degrees, and preferably in the range of 25-30 degrees. The seat may be inclined upwardly toward the front slightly to raise the knees so that the lower portions of the legs straddle the engine housing with the feet resting on pegs, such as the one designated 44 in FIGS. 1 and 2 attached to the frame members 20 and 21. To lower the rider, the central frame portion 15 is elongated in a fore-to-aft direction—as determined by the length of the frame members 29, 30. Further, the horizontal frame members 29, 30 define a horizontal plane for supporting the seat 36 which plane is well below the top of the forward frame section 13 as well as the upper horizontal portion 41 of the rear frame section 14.

The relationship of the location of the body to the frame is considered to be an important advantage of the present invention because it lowers the center of gravity of the combination of vehicle and rider to permit better operational performance. It also gives the rider a psychological feeling of security in relation to the type of motorcycle in which the rider is on top of the vehicle because he is at least partially surrounded by the vehicle itself (see FIG. 1). Still further, by lowering the rider, he in fact receives protection from the forward frame section 13 (see FIG. 10), from the steering structure (see FIG. 1), and from the raised portion of the rear frame section 14 (see FIGS. 1 and 11). The seat 36 is best seen in its entirety in FIGS. 6 and 7. It includes a concave portion 47 for supporting the buttox, and it rolls off at the forward edge portions such as at 49 to reduce pressure beneath the area of the thigh immediately above and behind the knee (called the popliteal area) for greater comfort by obviating pressure points, as is particularly important for sustained trips. The concave portion 47 extends upwardly and rearwardly, at the angle described above, to provide a lower backrest portion 50. The seat preferably does not provide direct support for the first three inches or so of the lower portion of the back (the area below the sacrum), but provides support above this area to maintain the natural curvature of the hollow of the back (the lumbar region). The upper portion of the rider seat then extends rearwardly at 51 to provide a seat or saddle for a passenger (see FIG. 5) as will be discussed more below. The seat is mounted to the horizontal frame members 29, 30 of the central section 15 of the frame, as well as to the flat portions 41, 42 of the element 40 of the rear frame section as seen in FIG. 10.

Referring now to FIGS. 1-4, a support module is generally designated 60; and it is located at the top of the rear section of the frame. It includes a shell 61 and a forward cushion 62. Preferably, the shell 61 forms a hollow container (see FIG. 4) and the cushion 62 is removable to permit access into the container for storage of items. Further, the module 60 may be located in a forward position (seen in FIGS. 1-4), a rear position (see FIGS. 5-7) or it may be completely removed (see FIG. 8). By mounting the vehicle license plate on the module 60 as at 64, and by locating the rear lights of the vehicle at the rear of the module 60, as at 65 in FIG. 6, when the module is removed, the vehicle cannot be operated legally; so that the ability to remove the module 60 provides some measure of protection against theft. A conventional disconnect cord is used, in this case, to connect the rear lights with the battery which is preferably stored within the rectangular intermediate frame section 15.

Figure 5:
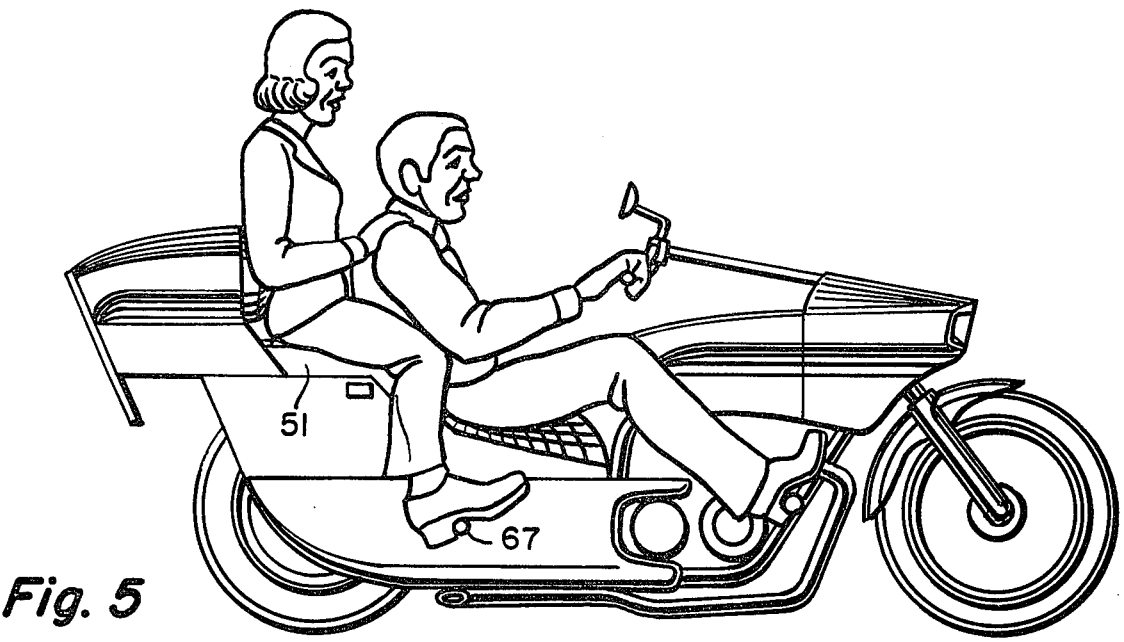
FIG. 5 is a right side elevational view of the vehicle, similar to FIG. 1, but with the support module in the rear position and including a passenger.
Figure 6:
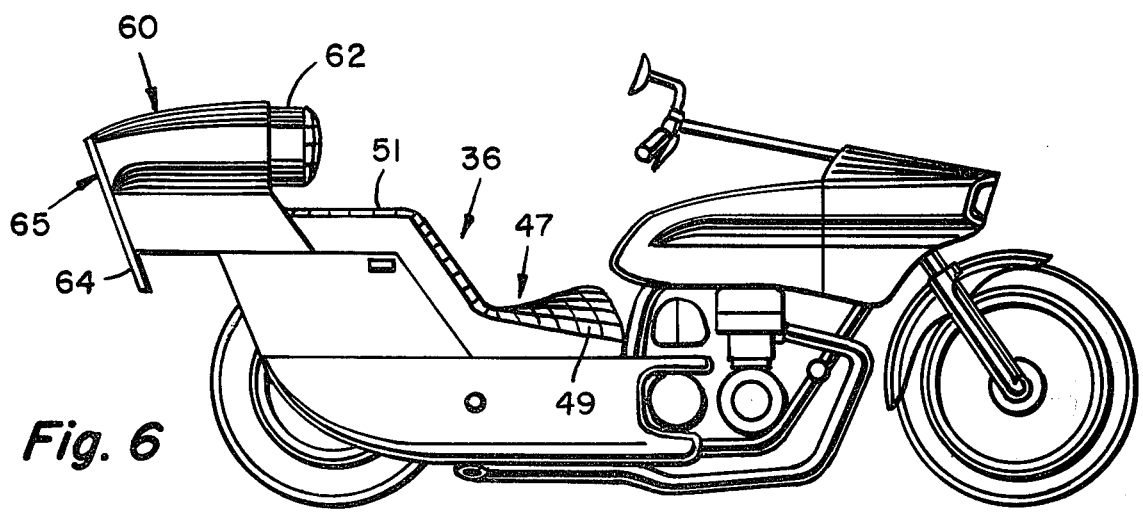
FIG. 6 is a view similar to FIG. 5 with both the rider and the passenger removed.
Figure 7:
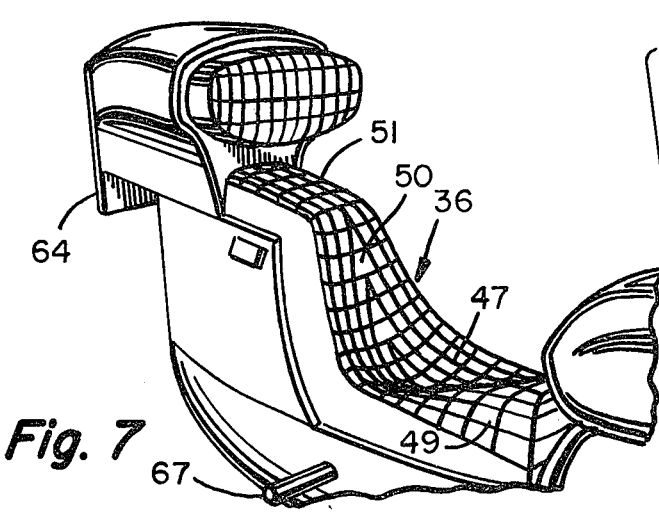
FIG. 7 is a view similar to FIG. 3 with the support module in the rear position and showing a passenger foot support peg extended.

When the support module 60 is in the forward position, as seen best in FIG. 1, the cushion 62 is located to support the thoracic region at the shoulder blade level of the rider. The location of the cushion 62 relative to the portion 47 of the seat 36 for this purpose is not critical. Rather, the location of the cushion 62 relative to the upper saddle portion 51 of the seat 36 (refer to FIG. 6) is more important because when the module 60 is moved to the rear position as seen in FIGS. 5 and 6, the cushion 62 serves as a lower back support for a passenger supported on the saddle 51. It will also be observed that the abdomen of the passenger supports the back of the thoracic region of the rider, and vice versa. Further, as best seen in FIG. 5, the passenger is located above the rider and does not have his or her view obstructed by the head of the rider.

The passenger also gains support by a pair of foot support pegs, one of which is designated 67. The foot support pegs are spring-loaded toward the extended position (see FIGS. 5 and 7). The outer surface of the peg 67 is slotted to receive a coin or screwdriver so that it may be held in a flush position (see FIGS. 1–4) when the vehicle is not set up to provide room for a passenger. To place the foot support peg in the storage position, it is pushed inwardly, thereby compressing the spring, and then turned to engage a suitable latching mechanism, such as a detent.

Figure 8:
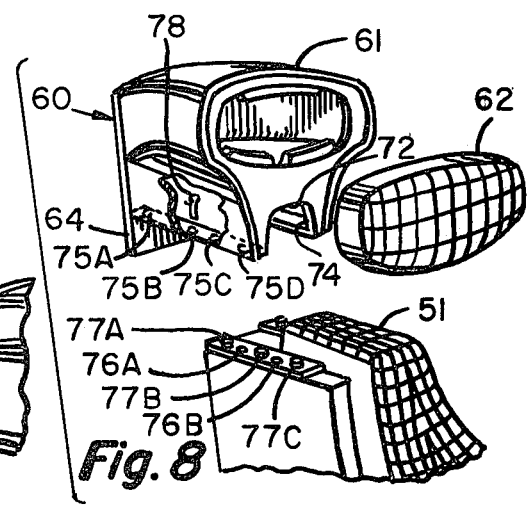
FIG. 8 is a fragmentary perspective view, with portions cut away, showing the mounting of the support module.

Turning now to FIG. 8, the structure for securing the support module 60 in the forward or rear positions described above will now be discussed. The shell 61 is recessed at 72 to receive the passenger saddle 51. The bottom of the shell 61 is provided with inwardly turned flanges 73, 74 which are similar and which attach to the upper portion of the rear frame section on either side of the saddle 51. Hence, only one of these structures need be discussed in detail for a full understanding of the invention. Turning then to the flange 73, it includes four apertures designated respectively 75A–75D. The upper portion of the rear frame section is provided with two apertures 76A, 76B and three upwardly projecting locater pins 77A–77C. An expandable collet 78 is used to secure the flange 73 to the frame of the vehicle as follows. When it is desired to locate the support module 60 in the forward position, the module is placed such that the pins 77A, 77B and 77C align respectively with the apertures 75A, 75B and 75D on the flange 73; and the collet 78 is received through aligned apertures 75C and 76B. By having a similar structure on the other side of the passenger saddle 51, the support module 60 is thus prevented from movement horizontally by the pin and aperture arrangement, and the collet 78 prevents its removal vertically. When it is desired to secure the support module in the rear position, the apertures 75B, 75D are aligned with pins 77A, 77B respectively and the collet 78 passes through aperture 75C, 76A which are aligned to receive it. By removing the collet 78 completely (as well as the one on the other side, not shown), the entire module 60 can be removed and carried as a container.

Referring back to FIGS. 1 and 2, it will be observed that much of the vehicle is provided with body paneling. This provides an aesthetic appearance by covering many of the functional components of the vehicle, but in addition, the paneling may be formed in an air stream pattern so as to reduce wind drag. A first body panel 85 acts as a housing for the headlights generally shown at 86 and also as a covering panel for the neck of the frame which receives the spindle of the front wheel. Further, the forward panel acts as a continuation of a panel 87 which acts as an upper motor shroud as well as a cover panel for a fuel storage tank, and an instrument panel, the instruments being generally located in the area designated 88 for convenient viewing by the rider. The panels 85, 87 are attached to the forward section 13 of the frame F, as well as to each other, along a line designated 89. The actual shape of the panels, their mounting and their locations may vary considerably, but the aesthetic and functional advantages are desirable.

Another panel is designated 90, and it covers the lower portions of the intermediate frame and rear frame as well as protects against contact with the drive chain (at least on the left side). A similar panel (not shown) is located on the other side of the vehicle. The passenger footrest peg 67 is recessed into this panel and flush with its outer surface in the storage position. Another panel designated 91 extends upwardly from the rear panel 90 and provides conforming shape to that of the shell 61 of the container 60.

It will thus be appreciated that a number of advantageous results are achieved from the improved vehicle configuration. By lowering the rider into the vehicle, and by re-orienting his body relative to the vehicle, the link angles at the hip, knee and ankle are opened, thereby providing a more comfortable ride and less fatigue. Further, the center of gravity of the combined vehicle and driver is lowered for greater lateral stability and better operating characteristics. Still further, the rider has a greater psychological feeling of security because of the supporting structure for his back, as well as the raised forward section of the frame and location of the engine. This provides practical safety as well, in comparison with the type of vehicle designed which sets the rider on top of the entire vehicle. The combination of lowering the rider and providing air-stream covering panels also reduces wind friction for more economical operation of the vehicle.

The provision of a dual-position container provides upper back support for the rider in one position and lower back support for a passenger in the rear position. Further, the passenger saddle is located at the top of the backrest portion of the rider's seat so that the passenger has an unobstructed view in the direction of travel. Still further, protection against possible theft is provided, as well as a convenience carrying case, by means of the module 60 which also preferably provides a mounting for the vehicle license plate as well as the rear vehicle lights.

Having thus disclosed in detail a preferred embodiment of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. In a two-wheeled vehicle having a front wheel, a rear wheel and an engine, the improvements comprising: frame means comprising a forward frame section, an intermediate frame section and a rear frame section, all of said frame sections providing a rigid integral frame for said vehicle and characterized in that the top of said intermediate frame section lies substantially below the tops of said other frame sections; means mounting said front wheel to said forward frame section; means mounting said engine to said forward frame section; foot rest means mounted for supporting the feet of a rider in a forward position relative to the knee of the rider and adjacent the forward frame section to define a link angle at the knee of approximately 110° or greater; means for mounting said rear wheel to said rear frame section; rider seat means having a seat portion and a backrest portion, said seat portion being mounted directly above said intermediate frame section, and said backrest portion extending upwardly and rearwardly for supporting the lumbar region of a rider at an angle substantially in the range of 15°–30° relative to the vertical; a passenger seat mounted to said rear frame section above the elevation of said seat portion of said rider seat means; and an upper support module slidably supported on the upper portion of said rear frame section and adapted for movement between a forward position in which said module covers said passenger seat and the forward portion of said module supports the thoracic region of the rider, and a rear position in which said passenger seat is exposed and a passenger may be accomodated between the thoracic region of the rider and the front end of the module such that the abdominal area of the passenger supports the thoracic region of the rider and the forward portion of said module supports the lumbar region of the passenger seated on said passenger seat.

2. The apparatus of claim 1 further comprising first and second support pegs adapted to receive the feet of said passenger and each selectively movable between an extended, supporting position and a retracted, storage position.

* * * * *